J. L. JONES.
AUTOMOBILE LOCK.
APPLICATION FILED JUNE 2, 1921.

1,428,236.

Patented Sept. 5, 1922.
2 SHEETS—SHEET 1.

INVENTOR:
Jonathan L. Jones
BY:
Adam E. Fisher
ATTORNEY.

J. L. JONES.
AUTOMOBILE LOCK.
APPLICATION FILED JUNE 2, 1921.

1,428,236.

Patented Sept. 5, 1922.
2 SHEETS—SHEET 2.

INVENTOR.
Jonathan L. Jones
BY Adam E. Fisher
ATTORNEY.

Patented Sept. 5, 1922.

1,428,236

UNITED STATES PATENT OFFICE.

JONATHAN L. JONES, OF AKRON, OHIO.

AUTOMOBILE LOCK.

Application filed June 2, 1921. Serial No. 474,472.

*To all whom it may concern:*

Be it known that I, JONATHAN L. JONES, a citizen of the United States, residing in the city of Akron and State of Ohio, have invented new and useful Improvements in Automobile Locks, of which the following is a specification, reference being had to the accompanying drawings.

This invention is an automobile lock, and the object is to provide a locking means which will both lock the rear wheels of the car against rotation and will simultaneously cut off the supply of gasoline from the engine.

Figure 1:
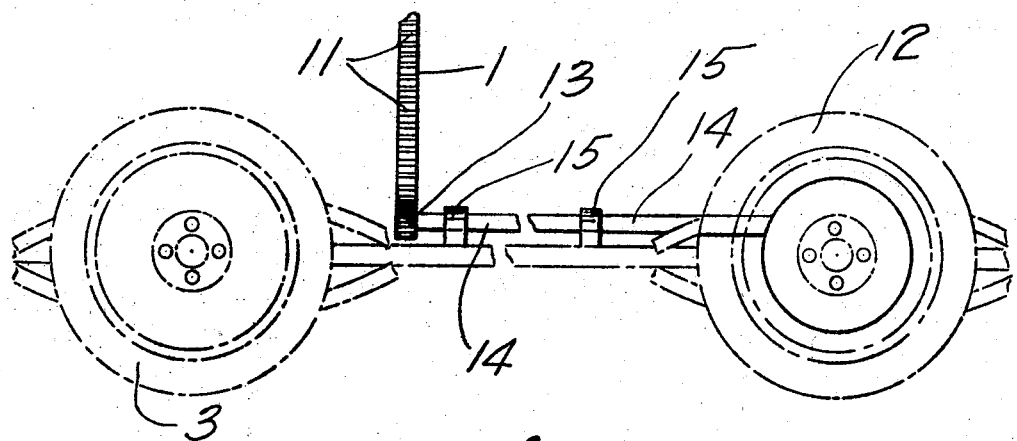
Figure 1 is a side elevation of the improvement as applied to a standard car, the car being represented in dotted lines.
Figure 2:
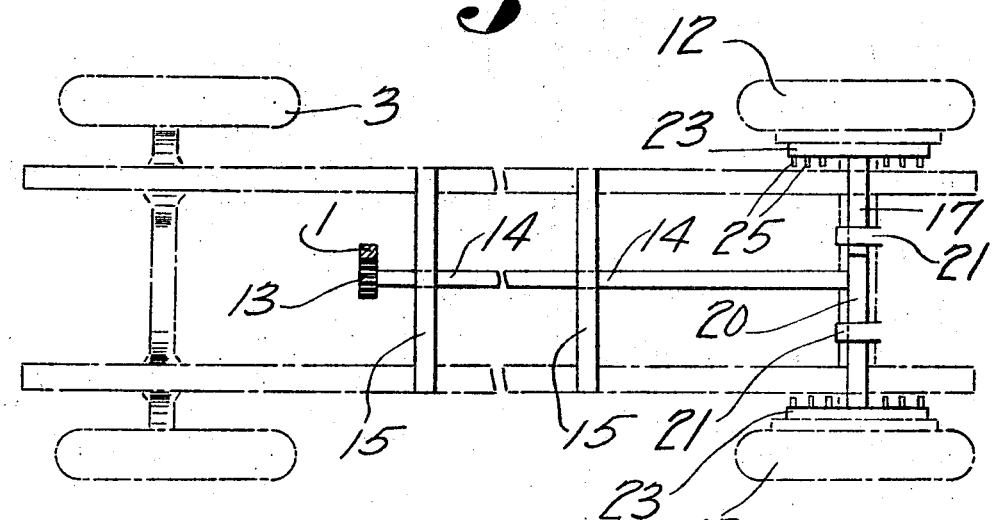
Figure 2 is a plan view, similarly representing the car in dotted lines.
Figure 3:
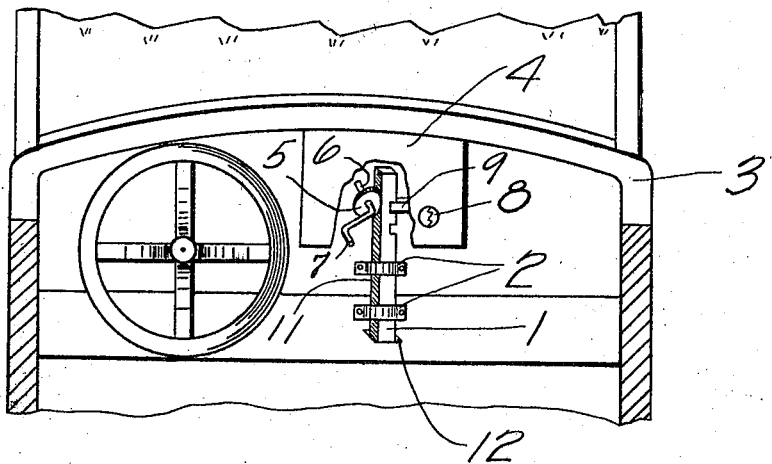
Figure 3 is a front view of the operating mechanism assembled at the dash.
Figures 5, 6:
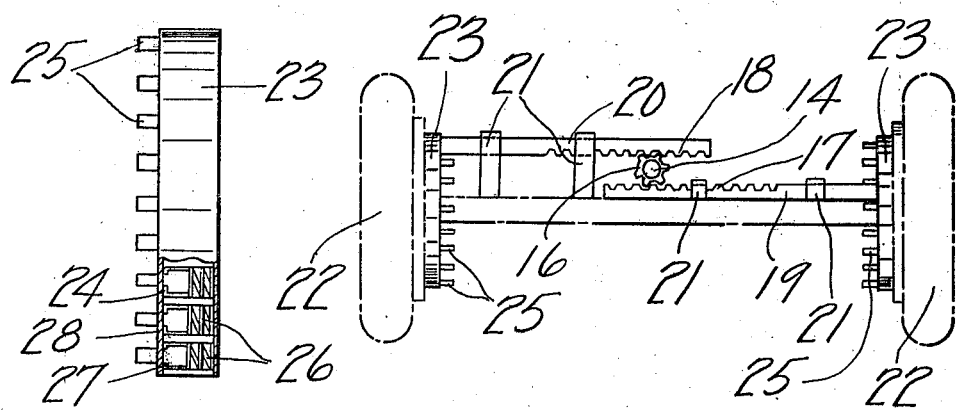
Figure 5 is a detail of the lock rings and pins.
Figure 6 is a rear elevation showing the wheel locking mechanism.
Figure 4:
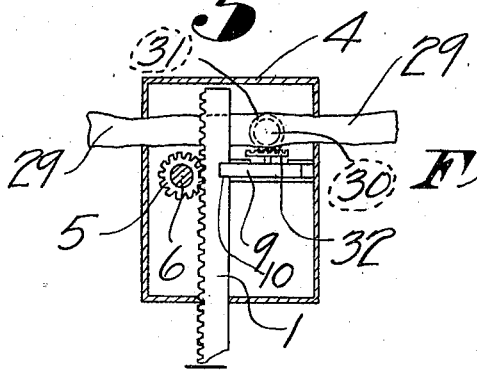
Figure 4 is a detail of the cut off valve and mechanism for the gasoline pipe.

In carrying out this invention I provide a rack bar 1 having teeth 11 and which rack is vertically and slidingly mounted through brackets 2 set at the front of the car 3. The upper end of this rack bar passes through a casing 4 on the dash of the car and meshes with a pinion 5 journaled in the casing on the stub shaft 6. A crank 7 at the outer end of the shaft 6 affords means for raising and lowering the rack bar. This rack bar 1 may be locked at any point in the casing 4 by means of the lock 8 set in the casing, the bolt 9 of which lock is adapted to engage anyone of a series of mortises or notches 10 cut in the rack bar 1 on the side or edge opposite to the teeth 11. The rack bar 1 is passed through a slot 12 in the floor of the car and the teeth 11 at this point mesh with a pinion 13 at the forward end of a turn bar 14 which is journaled in and through brackets 15 mounted on the chassis. At the rear end of the turn bar 14 is another pinion 16 meshing with the racks 17 and 18 on the lock bars 19 and 20 respectively. These lock bars are slidingly mounted through brackets 21 fixed to the chassis; their respective racks mesh with the pinion 16, one at the top side of the pinion and the other at the bottom side, and the bars extended out at each side, one toward each rear wheel 22. Upon the inner side of each rear wheel is mounted a lock ring 23, having a plurality of sockets 24 pierced laterally therein, and in these sockets are slidingly set a plurality of lock pins 25, which are normally held in their outmost position by springs 26 in the base of the sockets. The pins 25 are retained in their sockets by means of the flanges 27 on the inner ends engaging the shoulders 28 at the outer ends of the sockets 24. It is now obvious that when the rack bar 1 is released from the lock 8, the rack bar 1 may be raised or lowered by turning the crank 7. Lowering the rack bar 1 revolves the turn bar 14, which throws the lock bars 19 outwardly so that their outer ends mesh into the lock pins 25, forcing inwardly those pins which are immediately at the ends of the lock bars 19, and so locking the rear wheels against rotation. The rack bar 1 is then locked in this position by the lock 8. The reverse of this operation of course unlocks the car.

As an additional security against theft the gasoline supply pipe 29 leading to the carburetor, may be diverted through the casing 4 and a rotary valve 30 mounted in the line inside the casing, and made operable by a pinion 31 set over the valve and meshing with a rack 32 extended from and moving with the bolt 9 of the lock 8. Thus the gas supply is cut off at the same time the lock proper is operated.

While I have herein described a certain specific method of constructing and assembling the elements of my invention, it is understood same may be varied in minor details, not departing from the spirit of my invention as defined in the appended claims.

I claim:

1. An automobile lock, comprising a casing on the dash of the automobile; a rack bar vertically and slidingly mounted therethrough; a lock in the casing adapted to engage the rack bar; a crank and pinion engaging said rack bar; a turn bar journaled longitudinally on the chassis under the car body; a pinion at each end of the turn bar, the forward pinion being in mesh with the lower end of the said rack bar; lock bars having racks on their inner ends in mesh with the rear pinion of the turn bar, one at the upper side and one at the lower side of the pinion, and slidingly mounted and extended laterally adjacent the rear wheels of the automobile; and means located on the wheels for engaging the outwardly thrust ends of the lock bars.

2. In combination with an automobile, a lock therefor comprising a casing on the dash; a rack bar vertically and slidingly mounted through the casing; means for raising and lowering the rack bar; means for locking the rack bar in any set position; a turn bar journaled longitudinally beneath the car; a pinion at each end of the turn bar; lock bars having racks in mesh with the rear pinion of the turn bar and slidingly mounted and extended adjacent the rear wheels; a lock ring on the inner side of each rear wheel; a plurality of sockets pierced laterally in the rings; and a plurality of spring set lock pins mounted in the said sockets and adapted to engage the outwardly thrust ends of the said lock bars, for locking the wheels against rotation.

JONATHAN L. JONES.

Witnesses:
 DEAN F. MAY,
 IRENE KURTZ.